Patented Mar. 27, 1928.

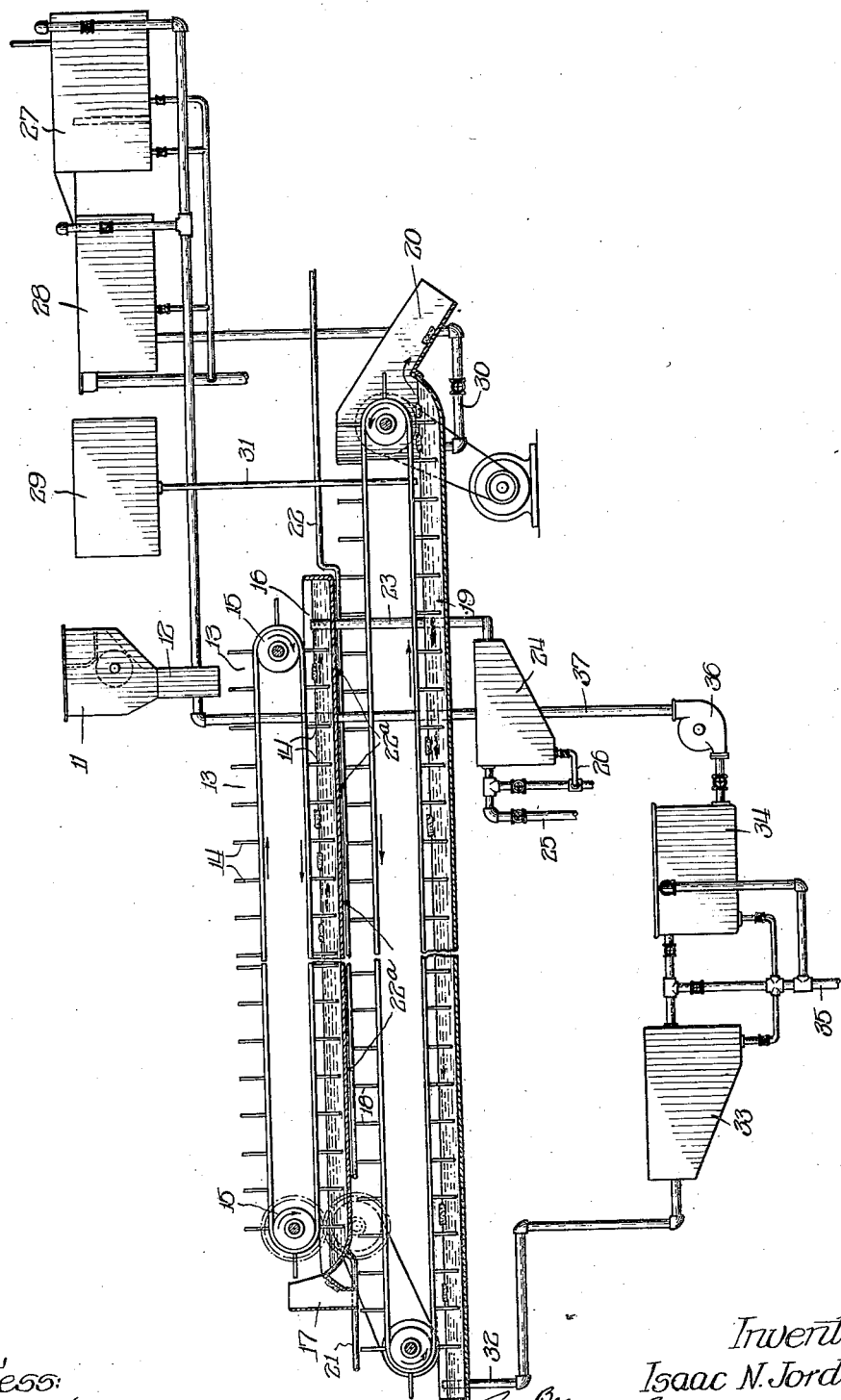

1,663,707

UNITED STATES PATENT OFFICE.

ISAAC N. JORDAN, OF CHICAGO, ILLINOIS, ASSIGNOR TO ARMOUR & COMPANY, OF CHICAGO, ILLINOIS, A CORPORATION OF ILLINOIS.

PROCESSING OF MEATS.

Application filed September 17, 1925. Serial No. 56,914.

The present invention relates to the processing of meats for food purposes and more specifically to the preparation of corned beef by cooking and curing.

The principal objects obtained by the new method of treatment are economy of time and space required, uniformity of cure and cooking, and a resultant improved quality in the flavor of the product.

While adaptable to other kinds of meats requiring to be cured in modified kinds of pickles and to be cooked over a greater or less period of time, the invention will be set out as applied in the preparation of corned beef for which it is typically suitable.

As used herein, the term "corned beef" is applied to beef which has been treated in a solution of common salt and other ingredients such as nitrate of soda, nitrite of soda and sugar, or other condiments and curing agents, for the purpose of preserving and imparting to the cooked meat a characteristic flavor and pink or reddish color. This treatment is commonly known as "curing" and the curing solution is called "pickle".

As hitherto practiced in the art, corned beef has been prepared by two methods which may be denominated respectively the "cold" cure and the "hot" cure, the former requiring treatment over a period of several days and the latter about one day.

According to the "cold" cure, the fresh meat, cut into pieces, is placed in a curing vat and covered with a pickle comprising a solution of common salt and sodium nitrate with or without sugar, where it remains for a period of from two days to two weeks depending upon the temperature of the pickle and the size of the meat pieces. Frequent stirring and shifting of the meat during the curing period is required. After the curing is completed the meat pieces are transferred to a cooking tank and cooked for a period of from twenty to forty-five minutes. The meat juices resulting from the cooking operation, being impregnated with pickle, are of little value and can only be employed in the making of low grade meat extracts.

By the "hot" method, the fresh meat is cut into pieces and cooked for a period of from thirty to forty-five minutes and the cooked meat is then transferred to a curing tank where it is covered with a hot pickle comprising, as a basis, a solution of salt and nitrate of soda with or without sugar. The meat pieces remain in the pickle for from four to eighteen hours, being occasionally stirred.

The pickle for the "hot" cure is prepared by the addition to a brine solution of nitrate of soda and sugar of from ten to fifty per cent of second-hand or used pickle to serve as an inoculating agent. It is then allowed to rest for a period of one to several days during which time the nitrate of soda is partially reduced to nitrite of soda by bacterial means. Thereupon the pickle is ripe for use in the curing of a batch of beef.

According to the present invention, the fresh meat is cut into strips or slices, preferably about one inch thick, and the pieces are separately placed in a traveling conveyor which carries them into and through a cooking tank where they are submerged in hot water and cooked for about twenty minutes, preferably while moving in a direction counter to that of a current of hot water flowing through the tank. The meat pieces are thereupon immediately discharged by the conveyor into a curing tank and moved therethrough in a direction opposed to a current of curing pickle comprising a solution of salt and nitrite of soda. This pickle consists preferably of a solution of eight ounces of nitrite of soda to one hundred gallons of 60° salometer brine. The speed of the conveyor and the length of the tank is so calculated that the subjection of the cooked meat pieces to the action of the pickle covers a period of about twenty minutes. The cooked and cured pieces of corned beef are then ready for consumption or for canning.

Corned beef according to the present invention, is completely cooked and cured in about forty minutes as compared with a period of days according to the "cold" and hours by the "hot" method previously in vogue.

Not only is there great saving in time and floor space by the employment of the new process but by the use of a pickle prepared direct from nitrite of soda, greater uniformity is assured, and uniformity is further facilitated by the cooking and the curing of the meat pieces for a definite length of time while separately subjected to the action of the cooking and curing baths.

Moreover, as compared with the cold method, a great saving is accomplished in that the juices or "soup" from the cooking meat are saved and utilized in the making of high grade meat extracts.

In order that the improved method may be better understood in every step of the procedure, a suitable form of apparatus for carrying out the invention is illustrated in the accompanying drawing, unnecessary detail being omitted, the drawing illustrating diagrammatically in longitudinal vertical section and partially in elevation, such apparatus.

Having reference to the drawing, the reference numeral 11 designates a meat slicer from the spout 12 of which the meat pieces are discharged between blades 14 of an endless conveyor traveling around the pulleys 15, 15, in a direction indicated by the arrows thereon, into the right-hand end of the cooking tank 16, and then carried in compartments 13 between the blades 14, through the tank towards the left-hand end of the same, in a direction counter to the flow of the cooking water. The cooked meat pieces are discharged at the left-hand end of the cooking tank, through the chute 17 between the blades 18 of another endless conveyor, the reaches of which travel in the direction indicated by the arrows, into the curing vat 19. The lower reach of this conveyor travels within the curing tank 19 moving to the right in a direction counter to the flow of the pickle therein. At the right-hand end of the curing vat the cured meat pieces are discharged into the chute 20 for delivery.

Hot water is supplied to the cooking tank 16 through the pipe 21 and the cooking temperature of the water is maintained and losses by evaporation and withdrawal compensated for by direct steam from the pipe 22 through jets 22ª which discharge into and along the bottom of the cooking tank. The desired level of the cooking fluid is maintained in the tank 16 by the withdrawal of the upper portion of the same through the pipe 23 which delivers this "soup" rich in fat and meat juices, to the separator 24, the fat being skimmed off and the "soup" for the preparation of meat extract being saved at 25 while the sediment or waste is drawn off at 26.

Pickle is constantly supplied to the curing vat 19 in required quantity from the salt, brine and nitrite reservoirs 27, 28 and 29 through the respective pipes, the brine discharging into the bottom of the curing tank through the pipe 30 while the nitrite ingredient is supplied through the pipe 31. By this arrangement the solution in the curing vat is maintained uniform and its level controlled by the overflow pipe 32 which discharges into the separator and settling tanks 33 and 34, whence the used pickle is discharged at intervals at 35 to waste; while in the meantime by means of the pump 36, a portion of the pickle is returned through the pipe 37 to the salt and brine tanks for reconditioning and resue to the extent found to be desirable.

From the foregoing it will be observed that according to this invention the curing and cooking is a continuous process; the time required is greatly reduced; space and labor are economized; the uniformity of cooking and curing is easily maintained; the quality of the product is enhanced; and sanitary conditions are greatly improved over that heretofore possible by reason of the elimination of manual handling.

I claim:

1. The method of processing meats which consists in cooking pieces of fresh meat in a current of hot water and thereafter curing the same in a current of heated pickle.

2. The method of processing meats which consists in cooking pieces of fresh meat while in motion in a counter current of hot water and immediately thereafter curing the same while in motion in a counter current of heated pickle.

3. The method of preparing corned beef which consists in cooking pieces of fresh meat in a current of heated fluid and thereafter subjecting the cooked meat to a current of pickle containing sodium nitrite.

4. The method of preparing corned beef which consists in cooking pieces of fresh meat for a period of between fifteen and thirty minutes in a current of hot water and thereafter subjecting the cooked meat for a like period of time to a current of pickle comprising a brine solution of sodium nitrite.

5. The method of preparing corned beef which consists in cooking pieces of fresh meat for a period of between fifteen and thirty minutes while in motion in a counter current of hot water and thereafter subjecting the cooked meat for a like period of time while in motion to a counter current of hot pickle comprising a brine solution of sodium nitrite.

6. The method of preparing corned beef in a continuous operation, which comprises the cooking of raw meat and the saving of liberated fats and meat extractives for food purposes, and the subsequent curing of the meat in a solution containing sodium chloride and sodium nitrite.

In testimony whereof I have hereunto subscribed my name.

ISAAC N. JORDAN.